US011869397B2

(12) United States Patent
Hashimoto et al.

(10) Patent No.: US 11,869,397 B2
(45) **Date of Patent: *Jan. 9, 2024**

(54) ABNORMALITY DETECTION CIRCUIT

(71) Applicant: Rohm Co., Ltd., Kyoto (JP)

(72) Inventors: Akira Hashimoto, Kyoto (JP); Takateru Yamamoto, Kyoto (JP); Sukenori Ito, Kyoto (JP); Yasunobu Inoue, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/083,028

(22) Filed: Dec. 16, 2022

(65) Prior Publication Data

US 2023/0121542 A1 Apr. 20, 2023

Related U.S. Application Data

(60) Continuation of application No. 17/875,793, filed on Jul. 28, 2022, now Pat. No. 11,620,926, which is a (Continued)

(30) Foreign Application Priority Data

Jul. 23, 2018 (JP) ................................ 2018-137846

(51) Int. Cl.

*G09G 3/36* (2006.01)
*G02F 1/133* (2006.01)
*G09G 3/00* (2006.01)

(52) U.S. Cl.

CPC .......... *G09G 3/006* (2013.01); *G09G 3/3696* (2013.01); *G09G 2330/12* (2013.01); *G09G 2380/10* (2013.01)

(58) Field of Classification Search

CPC .. G09G 5/00; G09G 5/02; G09G 5/14; G09G 5/38; G09G 3/00; G09G 3/006; G09G 3/20; G09G 3/30; G09G 3/32; G09G 3/34; G09G 3/36; G09G 3/325; G09G 3/3258; G09G 3/3266; G09G 3/3275; G09G 3/3291; G09G 3/3696; G09G 2330/12; G09G 2380/10; G06F 3/038; G06F 3/041

See application file for complete search history.

(56) References Cited

U.S. PATENT DOCUMENTS 11,087,652 B2 8/2021 Hashimoto et al.
11,436,957 B2 9/2022 Hashimoto et al.
(Continued)

FOREIGN PATENT DOCUMENTS

JP 2009-276612 11/2009

*Primary Examiner* — Chanh D Nguyen
*Assistant Examiner* — Nguyen H Truong
(74) *Attorney, Agent, or Firm* — Fish & Richardson P.C.

(57) ABSTRACT

An abnormality detection circuit includes: a plurality of voltage dividing circuits; a first selector configured to select and output one of a plurality of outputs of the plurality of voltage dividing circuits; a first comparator configured to compare an output of the first selector with a reference voltage; and a first detector configured to detect an abnormality based on an output of the first comparator, wherein the selection of the first selector is switched in synchronization with a vertical synchronization signal or a horizontal synchronization signal of a liquid crystal display device.

6 Claims, 9 Drawing Sheets

Related U.S. Application Data continuation of application No. 17/370,301, filed on Jul. 8, 2021, now Pat. No. 11,436,957, which is a division of application No. 16/517,923, filed on Jul. 22, 2019, now Pat. No. 11,087,652.

(56) References Cited

U.S. PATENT DOCUMENTS

| | | | | |
|---|---|---|---|---|
| 2009/0121987 | A1 | 5/2009 | Fukutome et al. | |
| 2013/0127817 | A1 | 5/2013 | Hwang et al. | |
| 2015/0206487 | A1 | 7/2015 | Kim et al. | |
| 2015/0356932 | A1 | 12/2015 | Kim et al. | |
| 2016/0314747 | A1* | 10/2016 | Park | G09G 3/3266 |
| 2016/0365019 | A1* | 12/2016 | Lee | G09G 3/3688 |
| 2016/0365058 | A1 | 12/2016 | Nam et al. | |
| 2017/0115631 | A1 | 4/2017 | Jung et al. | |
| 2017/0168734 | A1* | 6/2017 | Zhang | G09G 5/02 |
| 2018/0090056 | A1 | 3/2018 | Kadota | |
| 2019/0122602 | A1 | 4/2019 | Yang et al. | |
| 2019/0279585 | A1 | 9/2019 | Suzuki et al. | |
| 2020/0027381 | A1 | 1/2020 | Hashimoto et al. | |
| 2020/0302886 | A1* | 9/2020 | Kasuo | G09G 3/3648 |
| 2021/0343207 | A1 | 11/2021 | Hashimoto et al. | |
| 2022/0366824 | A1 | 11/2022 | Hashimoto et al. | |

* cited by examiner

ABNORMALITY DETECTION CIRCUIT

CROSS-REFERENCE TO RELATED APPLICATION

This application is a Continuation of U.S. patent application Ser. No. 17/875,793, filed Jul. 28, 2022, which is a Continuation of U.S. patent application Ser. No. 17/370,301, filed Jul. 8, 2021, which is a Divisional of U.S. patent application Ser. No. 16/517,923, filed Jul. 22, 2019, now U.S. Pat. No. 11,087,652, which is based upon and claims the benefit of priority from Japanese Patent Application No. 2018-137846, filed on Jul. 23, 2018, the entire contents of which are incorporated herein by reference.

TECHNICAL FIELD

The present disclosure relates to an abnormality detection circuit for detecting an abnormality in a liquid crystal display device.

BACKGROUND

When an abnormality occurs in a liquid crystal display device, a normal video cannot be displayed on a liquid crystal display panel of the liquid crystal display device. By mounting an abnormality detection circuit for detecting an abnormality in the liquid crystal display device on the liquid crystal display device, various measures such as notifying a user of the abnormality, stopping the video display, etc. can be taken when the abnormality occurs in the liquid crystal display device.

In the related art, a liquid crystal display device capable of autonomously detecting an abnormality in operation is disclosed. However, in the liquid crystal display device disclosed in the related art, in addition to a display part for displaying an image, it is necessary to provide a measurement part for outputting a measurement signal indicating an orientation state of liquid crystal in a pixel circuit. Therefore, there is a need to use a special liquid crystal display panel in the liquid crystal display device disclosed in the related art.

SUMMARY

Some embodiments of the present disclosure provide an abnormality detection circuit capable of detecting an abnormality in a liquid crystal display device without using a special liquid crystal display panel.

According to an embodiment of the present disclosure, an abnormality detection circuit includes: a plurality of voltage dividing circuits; a first selector configured to select and output one of a plurality of outputs of the plurality of voltage dividing circuits; a first comparator configured to compare an output of the first selector with a reference voltage; and a first detector configured to detect an abnormality based on an output of the first comparator, wherein the selection of the first selector is switched in synchronization with a vertical synchronization signal or a horizontal synchronization signal of a liquid crystal display device.

In some embodiments, the abnormality detection circuit may further include: a switch part configured to select one of a first connection state in which the output of the first selector is supplied to an inverting input terminal of the comparator and the reference voltage is supplied to a non-inverting input terminal of the comparator, and a second connection state in which the output of the first selector is supplied to the non-inverting input terminal of the comparator and the reference voltage is supplied to the inverting input terminal of the comparator.

In some embodiments, the abnormality detection circuit may further include: a second selector configured to select one source channel of a plurality of source channels of a liquid crystal display panel; a second comparator configured to compare a voltage output from the one source channel selected by the second selector with a threshold voltage set according to a display gradation of the one source channel selected by the second selector; and a second detector configured to detect the abnormality based on the output of the second comparator, wherein the selection of the second selector is switched in synchronization with the horizontal synchronization signal or the vertical synchronization signal of the liquid crystal display device.

In some embodiments, the threshold voltage is a first threshold voltage corresponding to a gradation obtained by adding a first predetermined gradation to the display gradation of the one source channel selected by the second selector, wherein the abnormality detection circuit further comprises: a third comparator configured to compare the voltage output from the one source channel selected by the second selector with a second threshold voltage corresponding to a gradation obtained by subtracting a second predetermined gradation from the display gradation of the one source channel selected by the second selector, and wherein the second detector detects the abnormality based on the output of the second comparator and an output of the third comparator.

In some embodiments, when the display gradation of the one source channel selected by the second selector falls within a predetermined range, one of the second comparator and the third comparator fixes the output regardless of a comparison result.

In some embodiments, abnormality detection circuit may further includes: a recognizer configured to recognize a timing at which a combined value of a plurality of voltages output from a plurality of source channels of a liquid crystal display panel is changed by a predetermined amount or more in a period in which the plurality of source channels do not affect display of the liquid crystal display device including the liquid crystal display panel; and a third detector configured to determine whether or not a pulse of a predetermined magnitude or more appears in a common voltage applied to a common electrode of the liquid crystal display panel at the timing recognized by the recognizer, and detect the abnormality based on a result of the determination.

In some embodiments, the abnormality detection circuit may further include: a fourth comparator configured to compare the common voltage with an allowable lower limit voltage; a fifth comparator configured to compare the common voltage with an allowable upper limit voltage; and a fourth detector configured to detect the abnormality based on an output of the fourth comparator and an output of the fifth comparator, wherein the third detector performs the determination by using the fourth comparator with a first pulse detection voltage replacing the allowable lower limit voltage and by using the fifth comparator with a second pulse detection voltage replacing the allowable upper limit voltage.

According to another embodiment of the present disclosure, an abnormality detection circuit including: a selector configured to select one source channel of a plurality of source channels of a liquid crystal display panel; a comparator configured to compare a voltage output from the one source channel selected by the selector with a threshold voltage set according to a display gradation of the one source channel selected by the selector; and a detector configured to detect an abnormality based on an output of the comparator, wherein the selection of the selector is switched in synchronization with a horizontal synchronization signal or a vertical synchronization signal of a liquid crystal display device.

According to another embodiment of the present disclosure, an abnormality detection circuit including: a recognizer configured to recognize a timing at which a combined value of a plurality of voltages output from a plurality of source channels of a liquid crystal display panel is changed by a predetermined amount or more in a period in which the plurality of source channels do not affect display of a liquid crystal display device including the liquid crystal display panel; and a detector configured to determine whether or not a pulse of a predetermined magnitude or more appears in a common voltage applied to a common electrode of the liquid crystal display panel at the timing recognized by the recognizer, and detect an abnormality based on a result of the determination.

According to another embodiment of the present disclosure, a liquid crystal display device includes the abnormality detection circuit.

According to another embodiment of the present disclosure, a vehicle includes the liquid crystal display device.

DETAILED DESCRIPTION

1. Configuration Example of Liquid Crystal Display Device

Figure 1:
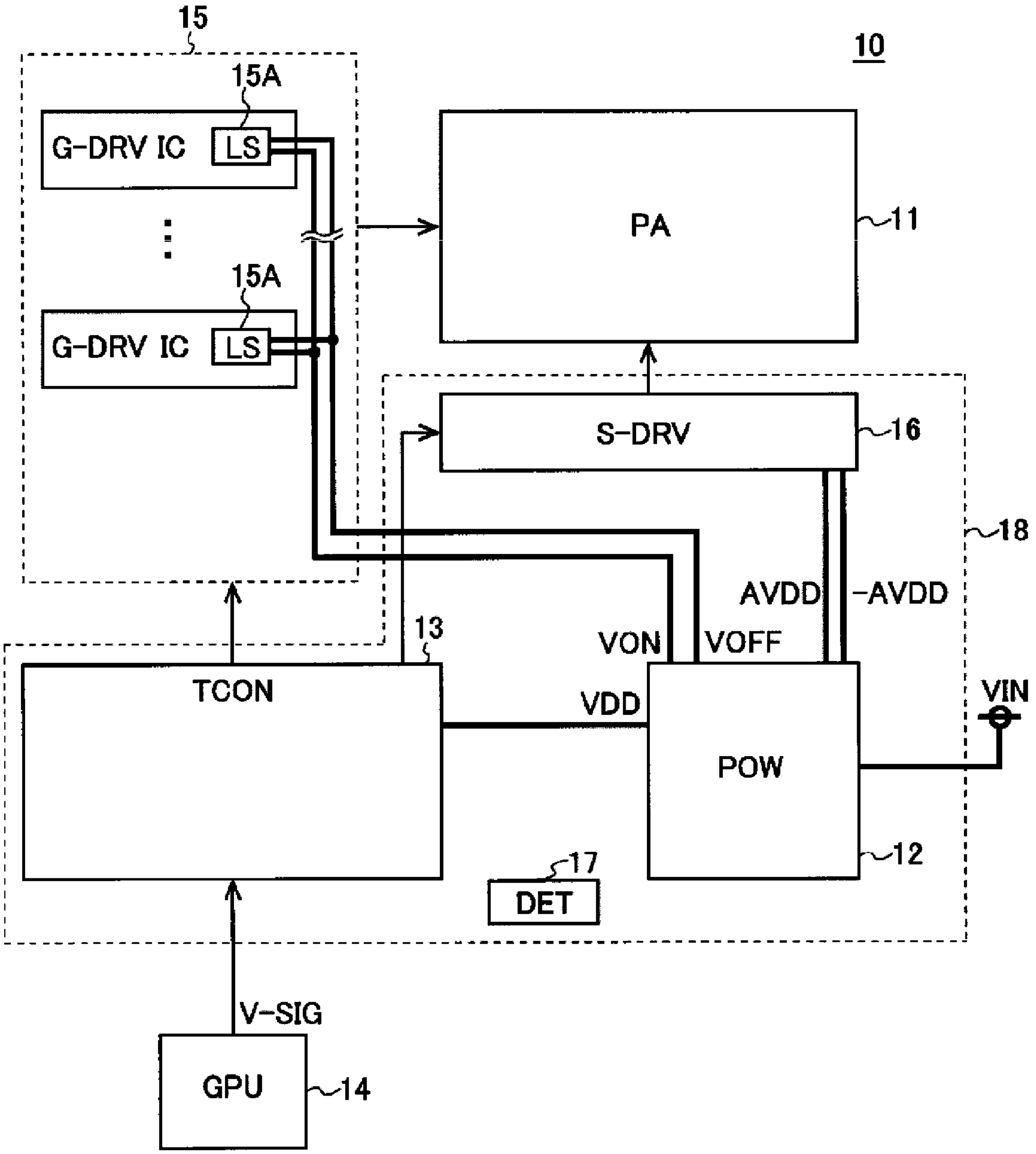
FIG. 1 is a block diagram showing a configuration example of a liquid crystal display device.

FIG. 1 is a block diagram showing a configuration example of a liquid crystal display device. The liquid crystal display device 10 includes a pixel array 11, a system power supply 12, a timing controller 13, a GPU (Graphics Processing Unit) 14, a gate driver 15, a source driver 16, and a backlight (not shown). The gate driver 15 includes a plurality of gate driver ICs. Each gate driver IC includes a level shifter 15A and a switch (not shown) of an output stage. The system power supply 12, the timing controller 13, the source driver 16 and an abnormality detection circuit 17 to be described later are formed in a one-chip semiconductor integrated circuit device 18. In some embodiments, the system power supply 12, the timing controller 13, the source driver 16 and the abnormality detection circuit 17 to be described later may be configured by a plurality of chips.

Figure 2:
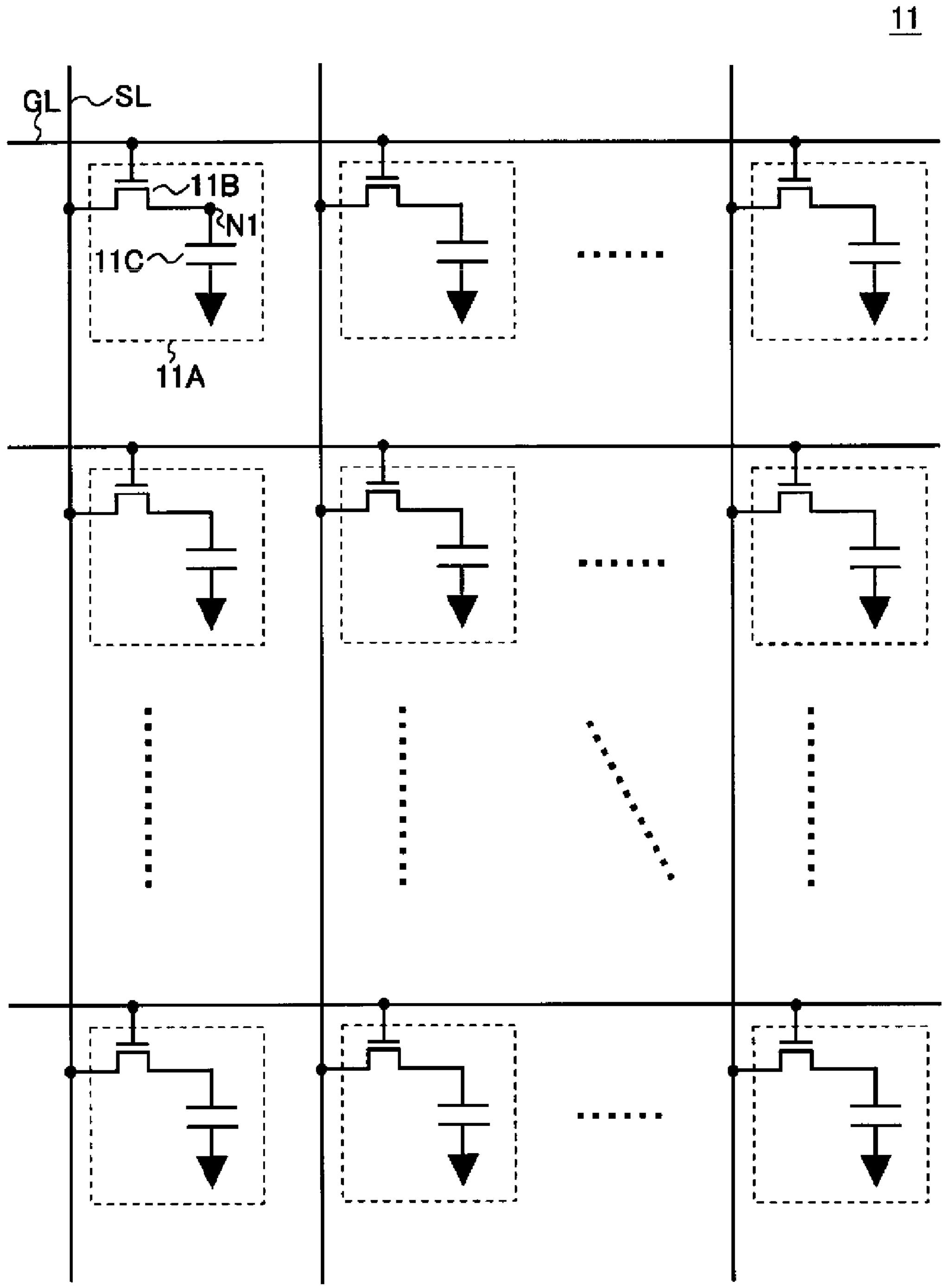
FIG. 2 is a view showing a configuration example of a pixel array.

As shown in FIG. 2, the pixel array 11 includes a plurality of pixel circuits 11A arranged in a plurality of rows and columns, a plurality of gate lines GL provided respectively corresponding to a plurality of rows, and a plurality of source lines SL provided respectively corresponding to a plurality of columns. One end of each gate line GL is connected to the gate driver 15. One end of each source line SL is connected to the source driver 16.

Each pixel circuit 11A has a TFT (Thin Film Transistor) 11B and a liquid crystal cell 11C. In some embodiments, a switch, which can be on/off-controlled according to a voltage applied to a gate line GL, may be used instead of the TFT. A gate of the TFT 11B is connected to the corresponding gate line GL. A source of the TFT 11B is connected to the corresponding source line SL. A drain of the TFT 11B is connected to a common electrode (not shown), to which a common voltage is applied via the corresponding liquid crystal cell 11C. The liquid crystal cell 11C has two opposing transparent electrodes and a liquid crystal sealed between the two opposing transparent electrodes.

When the gate line GL is at a low level, that is, when a negative power supply voltage VOFF to be described later is applied to the gate line GL, the TFT 11B is turned off. On the other hand, when the gate line GL is at a high level, that is, when a positive power supply voltage VON to be described later is applied to the gate line GL, the TFT 11B is turned on. When the TFT 11B is in the turn-on state, the voltage of the source line SL is written in a memory node N1 between the drain of the TFT 11B and the liquid crystal cell 11C, and the voltage written in the memory node N1 is held in the memory node N1 when the TFT 11B is switched from the turn-on state to the turn-off state. The light transmittance of the liquid crystal cell 11C is changed in accordance with the voltage written in the memory node N1. If the pixel array 11 is of a normally white type, the light transmittance of the liquid crystal cell 11C is maximized when the voltage written in the memory node N1 is equal to the common voltage. On the other hand, if the pixel array 11 is of a normally black type, the light transmittance of the liquid crystal cell 11C is minimized when the voltage written in the memory node N1 is equal to the common voltage.

Returning to FIG. 1, the system power supply 12 operates by receiving an input voltage VIN (for example, +3.3V) to generate an analog positive power supply voltage AVDD (for example, +6V), an analog negative power supply voltage −AVDD (for example, −6V), a logic power supply voltage VDD (for example, +5V, +1.8V or +1.2V), a positive power supply voltage VON (for example, +28V), and a negative power supply voltage VOFF (for example, −12V), and supply the same to the respective parts of the device. The system power supply 12 generates a plurality of power supply voltages including the power supply voltages and a plurality of reference voltages.

The timing controller 13 operates by receiving the logic power supply voltage VDD, and controls operation timings of the gate driver 15 and the source driver 16 based on a video signal V-SIG supplied from the GPU 14.

The level shifter 15A in the gate driver IC operates by receiving the positive power supply voltage VON and the negative power supply voltage VOFF, and shifts the level of a control signal supplied from the timing controller 13.

A plurality of gate driver ICs in the gate driver 15 sequentially selects the plurality of gate lines GL of the pixel array 11 for each predetermined time. The plurality of gate driver ICs in the gate driver 15 sets the selected gate lines GL to a high level.

In the present embodiment, as described above, the gate driver 15 has the plurality of gate driver ICs. A plurality of gate lines GL is allocated to each gate driver IC, and each gate line GL is connected to any one of the gate driver ICs. In some embodiments, the gate driver 15 may be configured as a single gate driver IC.

In the present embodiment, each gate driver IC is mounted on a glass substrate of a liquid crystal display panel by COG (Chip On Glass). In some embodiments, each gate driver IC may not be mounted on a glass substrate, but may be mounted on a substrate (for example, a printed circuit board) other than the glass substrate. In addition, in some embodiments, a panel of a type including a pixel array and a circuit portion corresponding to an output stage switch of each gate driver IC (a panel of a type called GIP (Gate In Panel) or GOA (Gate On Array)) may be used. When the panel of this type is used, only the circuit portion corresponding to the output stage switch in the gate driver IC is formed on the liquid crystal display panel, and the level shifter 15A is disposed outside the liquid crystal display panel.

The source driver 16 writes a voltage of a level corresponding to the video signal V-SIG, that is, a voltage corresponding to a display gradation, in the memory node N1 of each pixel circuit 11A corresponding to the gate line GL selected by the gate driver 15 via each source line SL.

The source driver 16 operates by receiving the analog positive power supply voltage AVDD and the analog negative power supply voltage −AVDD. The source driver 16 is mounted on a glass substrate of a liquid crystal display panel by COG (Chip On Glass). In some embodiments, the source driver 16 may be mounted by COF (Chip On Film).

In some embodiments, the source driver 16 may be configured by a plurality of source driver ICs.

The backlight (not shown) irradiates a back surface of the pixel array 11 with light. The light incident into the back surface of the pixel array 11 is adjusted in luminance according to light transmittance of each liquid crystal cell 11C in each pixel of the pixel array 11 and then is emitted from a front surface of the pixel array 11.

The liquid crystal display device 10 further includes the abnormality detection circuit 17. Hereinafter, abnormality detection circuits 17A to 17D according to first to fourth embodiments, respectively, which are examples of the abnormality detection circuit 17, will be described.

2. Abnormality Detection Circuit According to First Embodiment

Figure 3:
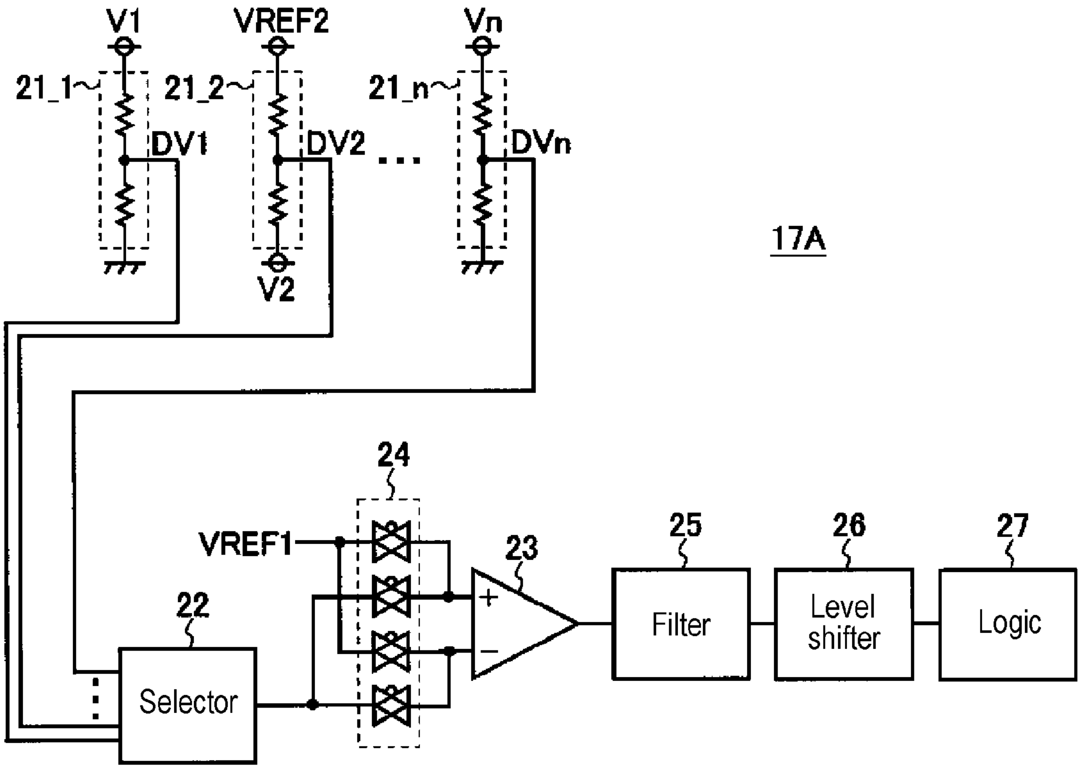
FIG. 3 is a view showing a configuration of an abnormality detection circuit according to a first embodiment of the present disclosure.

FIG. 3 is a view showing a configuration of the abnormality detection circuit 17A (hereinafter, referred to as the abnormality detection circuit 17A) according to the first embodiment of the present disclosure. As described above, the system power supply 12 generates a plurality of power supply voltages and a plurality of reference voltages. If a voltage generated by the system power supply 12 is abnormal, the liquid crystal display device 10 cannot perform normal display. Therefore, the abnormality detection circuit 17A performs abnormality detection on the voltage generated by the system power supply 12 as a monitoring target.

The abnormality detection circuit 17A includes a plurality of voltage dividing circuits 21_1 to **21_*n* (n is a natural number of 2 or more), a selector 22, a comparator 23, a switch part 24, a filter circuit 25, a level shifter 26 and a logic circuit 27**.

The plurality of voltage dividing circuits 21_1 to **21_*n* respectively divide voltages V1 to Vn to be monitored and output division voltages DV1 to DVn. In the configuration shown in FIG. 3, the voltages V1 and Vn are positive voltages, and the voltage V2** is a negative voltage.

Figure 4:
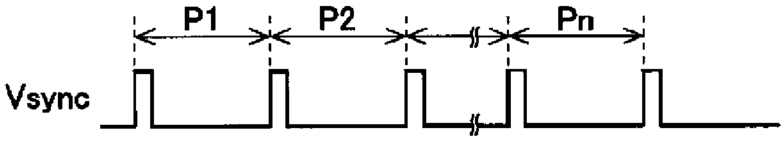
FIG. 4 is a waveform diagram of a vertical synchronization signal.

The selector 22 selects and outputs one of the division voltages DV1 to DVn respectively output from the plurality of voltage dividing circuits 21_1 to **21_*n*. Further, the selection of the selector 22 is switched in synchronization with a vertical synchronization signal Vsync of the liquid crystal display device 10. Therefore, the selector 22 selects the positive division voltage DV1 in a period P1 shown in FIG. 4, selects the negative division voltage DV2 in a period P2 shown in FIG. 4, and selects the positive division voltage DVn in a period Pn shown in FIG. 4**.

The comparator 23 compares an output of the selector 22 with a reference voltage VREF1.

The switch part 24 selects one of a first connection state where the output of the selector 22 is supplied to the inverting input terminal of the comparator 23 and the reference voltage VREF1 is supplied to the non-inverting input terminal of the comparator 23, and a second connection state where the output of the selector 22 is supplied to the non-inverting input terminal of the comparator 23 and the reference voltage VREF1 is supplied to the inverting input terminal of the comparator 23. When a low voltage abnormality of the positive voltage is detected, the selector 22 selects the positive division voltage, and the switch part 24 selects the first connection state. On the other hand, when a low voltage abnormality of the negative voltage is detected, the selector 22 selects the negative division voltage, and the switch part 24 selects the second connection state.

By operating the switch part 24 as described above, even when a low voltage abnormality of the positive voltage is detected or even when a low voltage abnormality of the negative voltage is detected, if the low voltage abnormality does not occur, the output of the comparator 23 goes to a low level. On the other hand, if the low voltage abnormality occurs, the output of the comparator 23 goes to a high level. If it does not matter that an output logic of the comparator 23 when the low voltage abnormality occurs is reversed between the case where the low voltage abnormality of the positive voltage is detected and the case where the low voltage abnormality of the negative voltage is detected, installation of the switch part 24 may be omitted. If the switch part 24 is not provided, the logic circuit 27 may be configured to recognize the reverse of the output logic of the comparator 23 at the time of occurrence of the low voltage abnormality between the case where the low voltage abnormality of the positive voltage is detected and the case where the low voltage abnormality of the negative voltage is detected. Then, the logic circuit 27 may recognize the timing at which the case of detecting the low voltage abnormality of the positive voltage and the case of detecting the low voltage abnormality of the negative voltage are switched.

The filter circuit 25 removes noise from the output of the comparator 23. The level shifter 26 shifts the level of the output voltage of the filter circuit 25. In some embodiments, the level shifter 26 may be provided in the front stage of the filter circuit 25. Further, in some embodiments, the comparator 23 may incorporate at least one of the filter circuit 25 and the level shifter 26.

The logic circuit 27 detects a low voltage abnormality of a voltage to be monitored, based on the output of the level shifter 26. For example, in the period P1 in which the selector 22 selects the division voltage DV1, the logic circuit 27 detects a low voltage abnormality of the voltage V1 if the output of the level shifter 26 is at a high level.

In some embodiments, a timing at which the logic circuit 27 takes in the output of the level shifter 26 in each of the periods P1 to Pn may be changed by a register setting of the logic circuit 27. For example, the timing may be in a period in which a voltage to be monitored is stable, such as in a vertical blanking period in some embodiments.

Enabling or disabling the function of detecting the low voltage abnormality may be controlled by the register setting of the logic circuit 27 for each voltage to be monitored in some embodiments.

In addition, the logic circuit 27 may count, for each voltage to be monitored, how many times the low voltage abnormality has been detected in a certain fixed period, and may determine the low voltage abnormality if the number of times is a prescribed number or more. Then, a length of the certain fixed period and the prescribed number of times may be controlled by the register setting of the logic circuit 27 for each voltage to be monitored.

Upon detecting the low voltage abnormality of the voltage to be monitored, the logic circuit 27 may transmit an abnormality detection signal to, for example, the GPU 14. Instead of or in addition to the transmission of the abnormality detection signal, for example, information on the low voltage abnormality of the voltage to be monitored may be read out from the logic circuit 27 by the GPU 14. Further, processing contents after the detection of the low voltage abnormality of the voltage to be monitored may be changed by the register setting of the logic circuit 27 in some embodiments.

Since the abnormality detection circuit 17A shifts the timing of detecting the low voltage abnormality of the voltage to be monitored for each voltage to be monitored, the number of comparators 23 can be reduced. Since the timing of detecting the low voltage abnormality of the voltage to be monitored is synchronized with the vertical synchronization signal Vsync of the liquid crystal display device 10, it is not necessary to newly generate a timing signal for the abnormality detection circuit 17A. Therefore, the abnormality detection circuit 17A has a small circuit size even when the number of voltages to be monitored is large.

In the present embodiment, the selection of the selector 22 is switched in synchronization with the vertical synchronization signal Vsync of the liquid crystal display device 10, but may be switched in synchronization with a horizontal synchronization signal of the liquid crystal display device 10.

Further, in the present embodiment, although the low voltage abnormality of a voltage to be monitored is detected, a high voltage abnormality of the voltage to be monitored may be detected.

Moreover, in the present embodiment, although one comparator is provided for all voltages to be monitored, one comparator may be provided for a plurality of positive voltages to be monitored and another comparator may be provided for a plurality of negative voltages to be monitored.

3. Abnormality Detection Circuit According to Second Embodiment

Figure 5:
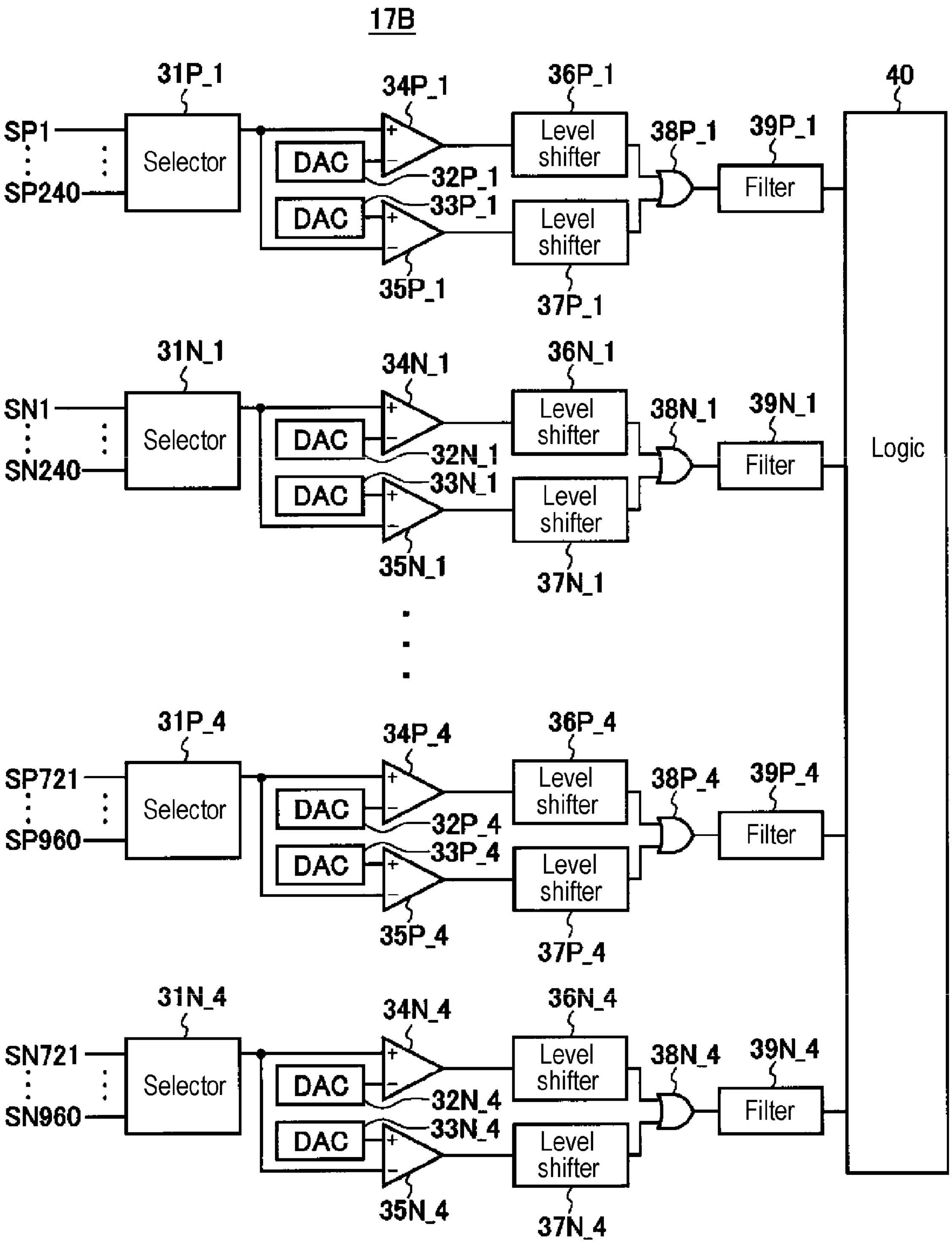
FIG. 5 is a view showing a configuration of an abnormality detection circuit according to a second embodiment of the present disclosure.

FIG. 5 is a view showing a configuration of the abnormality detection circuit 17B (hereinafter referred to as the abnormality detection circuit 17B) according to the second embodiment. The abnormality detection circuit 17B can detect abnormalities such as short-circuit of the gate and the source of the TFT 11B shown in FIG. 2, short-circuit between adjacent output terminals of the source driver 16, a failure of the source driver 16, etc. In the present embodiment, a case where the number of source lines SL is 1920 will be described as an example.

The abnormality detection circuit 17B performs abnormality detection for eight categories into which the positive side voltages SP1 to SP960 and the negative side voltages NP1 to NP960 output from all the source channels are divided. As one of these cases, abnormality detection of the positive side voltages SP1 to SP240 will be described below.

Figure 6:
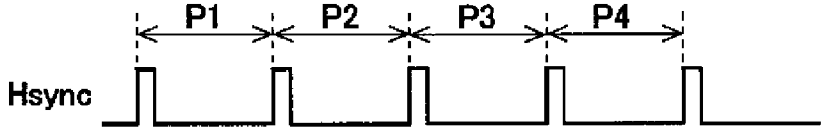
FIG. 6 is a waveform diagram of a horizontal synchronization signal.

A selector 31P_1 selects one from 1ch to 480ch. Then, the selection of the selector 31P_1 is switched in synchronization with the horizontal synchronization signal Hsync of the liquid crystal display device 10. When a positive side voltage is output from the odd-numbered channels, the selector 31P_1 selects 1ch in a period P1 shown in FIG. 6, and selects 3ch in a period P2 shown in FIG. 6. On the other hand, when a positive side voltage is output from the even-numbered channels, the selector 31P_1 selects 2ch in the period P1 shown in FIG. 6, and selects 4ch in the period P2 shown in FIG. 6. Therefore, in the period P1 shown in FIG. 6, the positive side voltage SP1 is output from the source channel selected by the selector 31P_1, and in the period P2 shown in FIG. 6, the positive side voltage SP2 is output from the source channel selected by selector 31P_1.

A D/A converter 32P_1 outputs an upper first threshold voltage (analog voltage) corresponding to a gradation obtained by adding a first predetermined gradation to a display gradation (digital data) of the source channel selected by the selector 31P_1. The D/A converter 32P_1 receives data on the first predetermined gradation from the logic circuit 40. The first predetermined gradation may be changed by the register setting of the logic circuit 40 in some embodiments.

A D/A converter 33P_1 outputs a lower second threshold voltage (analog voltage) corresponding to a gradation obtained by subtracting a second predetermined gradation from the display gradation (digital data) of the source channel selected by the selector 31P_1. The second predetermined gradation may be the same as or different from the first predetermined gradation. The D/A converter 33P_1 receives data on the second predetermined gradation from the logic circuit 40. The second predetermined gradation may be changed by the register setting of the logic circuit 40.

Figure 7:
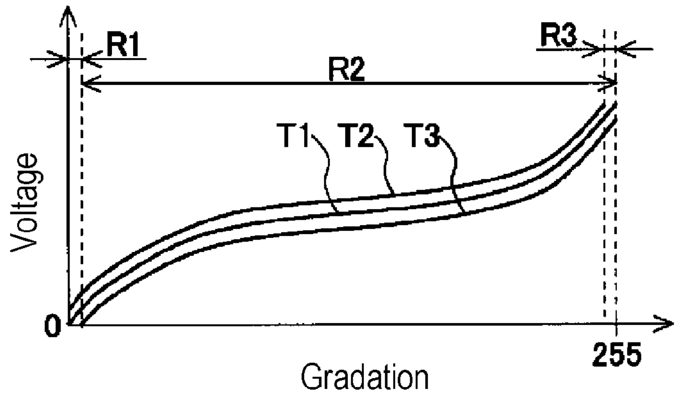
FIG. 7 is a view showing a relationship between a gradation and a source voltage.

A characteristic line T1 shown in FIG. 7 is a characteristic line showing a positive side voltage corresponding to a display gradation, a characteristic line T2 shown in FIG. 7 is a characteristic line showing an upper first threshold voltage, and a characteristic line T3 shown in FIG. 7 is a characteristic line showing a lower second threshold voltage.

A comparator 34P_1 compares the positive side voltage output from the source channel selected by the selector 31P_1 with the upper first threshold voltage. However, in a region R3 (see FIG. 7) in which the display gradation is (256−first predetermined gradation) to 255, the output of the comparator 34P_1 is fixed at a low level regardless of the comparison result of the comparator 34P_1.

A comparator 35P_1 compares the positive side voltage output from the source channel selected by the selector 31P_1 with the lower second threshold voltage. However, in a region R1 in which the display gradation is 0 to (second predetermined gradation−1), the output of the comparator 35P_1 is fixed to a low level regardless of the comparison result of the comparator 35P_1.

A level shifter 36P_1 shifts the level of the output voltage of the comparator 34P_1. A level shifter 37P_1 shifts the level of the output voltage of the comparator 35P_1.

An OR gate 38P_1 outputs the logical sum of the output of the level shifter 36P_1 and the output of the level shifter 37P_1. A filter circuit 39P_1 removes noise from the output of the OR gate 38P_1.

The logic circuit 40 detects an abnormality in the positive side voltages SP1 to SP240 based on the output of the filter circuit 39P_1. For example, in the period P1 in which the positive side voltage SP1 is output from the source channel selected by the selector 31P_1, the logic circuit 40 detects an abnormality in the positive side voltage SP1 when the output of the filter circuit 39P_1 is at a high level. Here, the abnormality of the positive side voltage SP1 means that the gradation corresponding to the source channel, which outputs the positive side voltage SP1, is out of a range from (the display gradation of the source channel that outputs the positive side voltage SP1−the second predetermined gradation) to (the display gradation of the source channel that outputs the positive side voltage SP1+the first predetermined gradation).

In some embodiments, the timing at which the logic circuit 40 takes in the output of the filter circuit 39P_1 in each cycle (each period, P1, P2, P3, P4, . . . ) of the horizontal synchronization signal Hsync may be changed by the register setting of the logic circuit 40.

In some embodiments, enabling or disabling the function of detecting the abnormality may be controlled by the register setting of the logic circuit 40 for each source output channel to be monitored.

In addition, the logic circuit 40 may count, for each source output channel to be monitored, how many times the abnormality has been detected in a certain fixed period, and may determine the abnormality if the number of times is a prescribed number or more. Then, the length of the certain fixed period and the prescribed number of times may be controlled by the register setting of the logic circuit 40 for each source output channel to be monitored in some embodiments.

When detecting the abnormality of a voltage output from the source channel to be monitored, the logic circuit 40 may transmit an abnormality detection signal to, for example, the GPU 14. Instead of or in addition to the transmission of the abnormality detection signal, for example, information on the abnormality of the voltage output from the source channel to be monitored may be read out from the logic circuit 40 by the GPU 14. Further, the processing contents after the detection of the abnormality of the voltage output from the source channel to be monitored may be changed by the register setting of the logic circuit 40 in some embodiments.

In the present embodiment, although the positive side voltages SP1 to SP960 and the negative side voltages NP1 to NP960 output from all the source channels are divided into eight categories to perform abnormality detection, the number of division categories is not limited to eight. In addition, if the source driver 16 is a driver that outputs only the positive side voltage from the source channel, since a negative side circuit is unnecessary, the negative side circuits (the selectors 31N_1 to 31N_8, the D/A converters 32N_1 to 32N_8 and 33N_1 to 33N_8, the comparators 34N_1 to 34N_8 and 35N_1 to 35N_8, the level shifters 36N_1 to 36N_8 and 37N_1 to 37N_8, the OR gates 38N_1 to 38N_8, and the filter circuits 39N_1 to 39N_8 shown in FIG. 5) may be removed from the abnormality detection circuit 17B. In some embodiments, the level shifters may be provided in the rear stage of the OR gates, and the filter circuits may be provided in the front stage of the OR gates. Further, in some embodiments, each comparator may incorporate at least one of the filter circuit and the level shifter.

Since the abnormality detection circuit 17B shifts the timing of detecting the abnormality of the voltage output from the source channel to be monitored for each source output channel to be monitored, in each of the eight division categories into which the positive side voltages SP1 to SP960 and the negative side voltages NP1 to NP960 output from all the source channels are divided, the number of comparators 23 can be reduced. Since the timing of detecting the abnormality of the voltage output from the source channel to be monitored is synchronized with the horizontal synchronization signal Hsync of the liquid crystal display device 10, it is not necessary to newly generate a timing signal for the abnormality detection circuit 17B. Therefore, the abnormality detection circuit 17B has a small circuit size even when the number of source output channels to be monitored is large. Further, in the present embodiment, although the selection of the selectors 31P_1 to 31P 4 and 31N_1 to 31N 4 is switched in synchronization with the horizontal synchronization signal Hsync of the liquid crystal display device 10, it may be switched in synchronization with a vertical synchronization signal of the liquid crystal display device 10.

4. Abnormality Detection Circuit According to Third Embodiment

Figure 8:
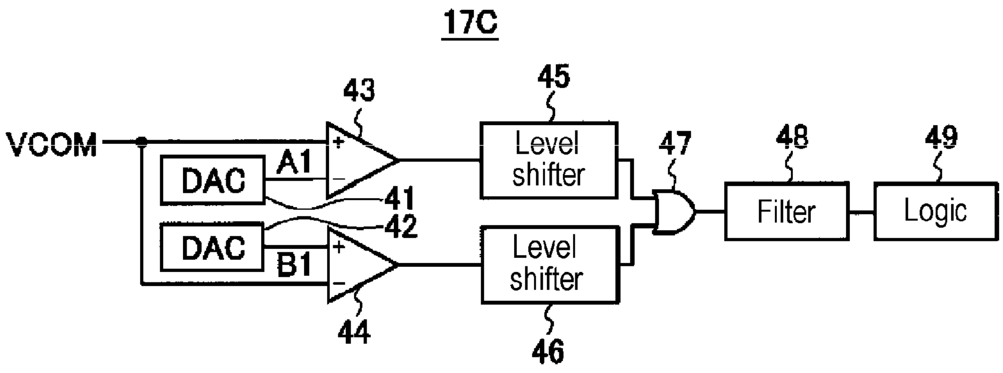
FIG. 8 is a view showing a configuration of an abnormality detection circuit according to a third embodiment of the present disclosure.

FIG. 8 is a view showing a configuration of the abnormality detection circuit 17C (hereinafter, referred to as the abnormality detection circuit 17C) according to the third embodiment.

In the pixel array 11 shown in FIG. 2, when a voltage output from the source channel is changed, the change propagates to the common electrode via the liquid crystal cell 11C and a pulse appears in the common voltage. Therefore, by using a pulse that can appear in the common voltage, it is possible to monitor whether or not the liquid crystal display panel is driven normally and detect a drive abnormality of the liquid crystal display panel.

However, since the common electrode is connected to all the liquid crystal cells 11C, the change in voltages output from all the source channels affect the common voltage. Further, in a period during which the liquid crystal display panel is displaying an arbitrary video, since the value of the voltage output from each source channel is determined according to the contents of the video, a large pulse does not always appear in the common voltage even if the liquid crystal display panel is driven normally.

For example, when a voltage output from one source channel is changed in an increasing direction and if a voltage output from another source channel is changed in a decreasing direction, since those changes cancel each other and propagate to the common electrode, a small pulse appears in the common voltage. Even when the cancellation does not occur, for example, when the change in voltage output from the source channel is small, a small pulse appears in the common voltage.

Therefore, from the viewpoint of improving accuracy of the drive abnormality detection of the liquid crystal display panel, the abnormality detection circuit 17C determines whether or not a pulse of a predetermined magnitude or more appears in the common voltage, at the timing when the combined value of voltages output from a plurality of source channels of the liquid crystal display panel is changed by a predetermined amount or more in a period in which the plurality of source channels does not affect the display of the liquid crystal display device 10.

The abnormality detection circuit 17C includes D/A converters 41 and 42, a comparator 43, level shifters 45 and 46, an OR gate 47, a filter circuit 48, and a logic circuit 49.

The D/A converter 41 converts an upper determination value (digital data) into an upper determination voltage (analog voltage) A1 and outputs the same. The D/A converter 41 receives the upper determination value from the logic circuit 49. The upper determination value may be changed by the register setting of the logic circuit 49 in some embodiments.

The D/A converter 42 converts a lower determination value (digital data) into a lower determination voltage (analog voltage) B1 and outputs the same. The D/A converter 42 receives the lower determination value from the logic circuit 49. The lower determination value may be changed by the register setting of the logic circuit 49 in some embodiments.

The level shifter 45 shifts the level of the output voltage of the comparator 43. The level shifter 46 shifts the level of the output voltage of the comparator 44.

The OR gate 47 outputs the logical sum of the output of the level shifter 45 and the output of the level shifter 46. The filter circuit 48 removes noise from the output of the OR gate 47.

The logic circuit 49 detects a drive abnormality of the liquid crystal display panel based on the output of the filter circuit 48. Specifically, the logic circuit 49 recognizes the timing when the combined value of voltages output from a plurality of source channels of the liquid crystal display panel is changed by a predetermined amount or more in a period in which the plurality of source channels does not affect the display of the liquid crystal display device 10, and detects the drive abnormality of the liquid crystal display panel when the output of the filter circuit 48 is at a low level at that timing.

Figure 9:
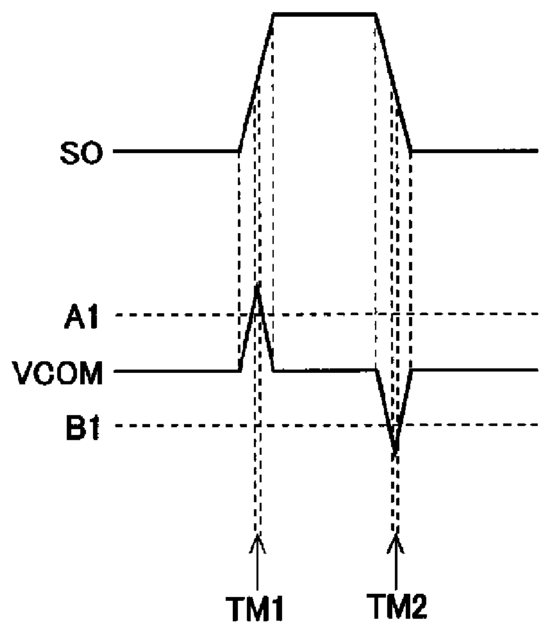
FIG. 9 is a view showing a relationship between a combined value of source voltages and a common voltage.

For example, at timings TM1 and TM2 shown in FIG. 9, since the output of the filter circuit 48 is at a high level, the logic circuit 49 does not detect a drive abnormality of the liquid crystal display panel. As shown in FIG. 9, in order to greatly increase the combined value SO of the voltages output from the plurality of source channels at the timing TM1, for example, the voltages output from all the source channels at the timing TM1 may be increased by a fixed amount. Similarly, as shown in FIG. 9, in order to greatly decrease the combined value SO of the voltages output from the plurality of source channels at the timing TM2, for example, the voltages output from all source channels at the timing TM2 may be reduced by a fixed amount.

Figure 10:
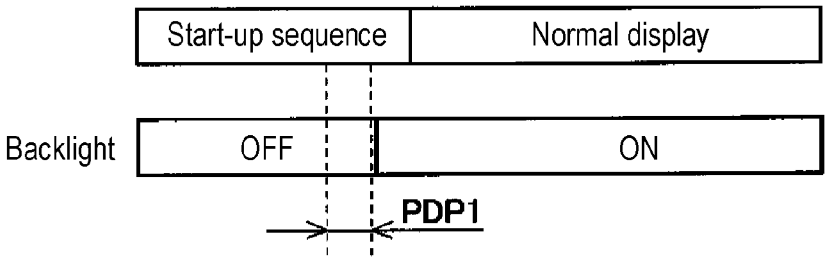
FIG. 10 is a view showing a relationship between a state of a liquid crystal display device and a state of a backlight.

An example of the period in which the plurality of source channels of the liquid crystal display panel does not affect the display of the liquid crystal display device 10 may include the last stage period PDP1 of the start-up sequence of the liquid crystal display device 10 shown in FIG. 10. In the last stage period PDP1 of the start-up sequence, the source driver 16 can output a voltage from the source channel. In addition, in the last stage period PDP1 of the start-up sequence, since the backlight of the liquid crystal display panel is turned off, a user cannot visually recognize the display of the liquid crystal display device 10 and therefore the source channels do not affect the display of the liquid crystal display device 10.

Figure 11:
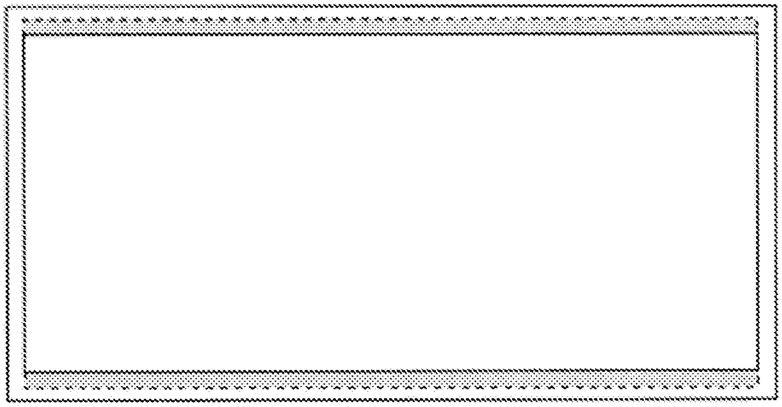
FIG. 11 is a schematic front view of a liquid crystal display device.

Another example of the period in which the plurality of source channels of the liquid crystal display panel does not affect the display of the liquid crystal display device 10 may include a period in which a gate line GL in a gray region shown in FIG. 11 in the normal display of the liquid crystal display device 10 shown in FIG. 1 is selected. The gray region shown in FIG. 11 is a region in which the screen of the liquid crystal display panel is covered by a bezel of the liquid crystal display device 10. The display of the gray region shown in FIG. 11 is covered by the bezel and cannot be viewed by a user. Therefore, the period in which the gate line GL of the gray region shown in FIG. 11 is selected is a period in which a source voltage does not affect the display of the liquid crystal display device 10.

The abnormality detection circuit 17C can detect the drive abnormality of the liquid crystal display panel without affecting the display of the liquid crystal display device 10.

The timing at which the logic circuit 49 takes in the output of the filter circuit 48 may be changed by the register setting of the logic circuit 49 in some embodiments.

In addition, the logic circuit 49 may count how many times the abnormality has been detected in a certain fixed period, and may determine the abnormality if the number of times is a prescribed number or more. Further, the length of the certain fixed period and the prescribed number of times may be controlled by the register setting of the logic circuit 49 in some embodiments.

When detecting the drive abnormality of the liquid crystal display panel, the logic circuit 49 may transmit an abnormality detection signal to, for example, the GPU 14. Instead of or in addition to the transmission of the abnormality detection signal, for example, information on the drive abnormality of the liquid crystal display panel may be read out from the logic circuit 49 by the GPU 14. Further, the processing contents after the detection of the drive abnormality of the liquid crystal display panel may be changed by the register setting of the logic circuit 49 in some embodiments.

In some embodiments, the level shifter may be provided in the rear stage of the OR gate 47, and the filter circuit may be provided in the front stage of the OR gate 47. Further, in some embodiments, each of the comparators 43 and 44 may incorporate at least one of the filter circuit and the level shifter.

5. Abnormality Detection Circuit According to Fourth Embodiment

Figure 12:
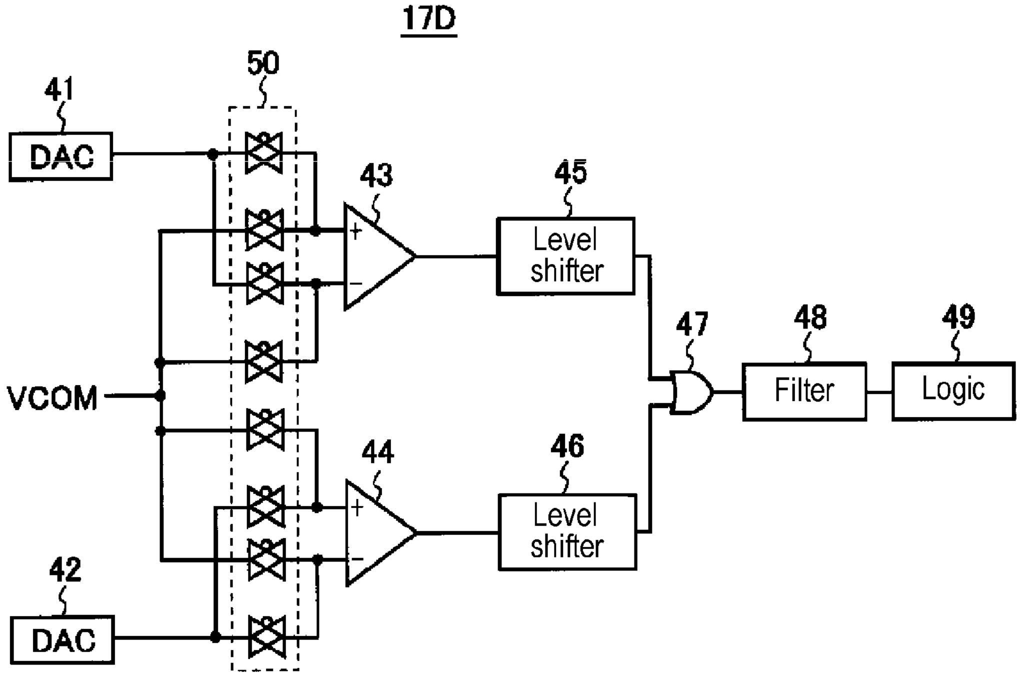
FIG. 12 is a view showing a configuration of an abnormality detection circuit according to a fourth embodiment of the present disclosure.

FIG. 12 is a view showing a configuration of the abnormality detection circuit 17D (hereinafter, referred to as the abnormality detection circuit 17D) according to the fourth embodiment. The abnormality detection circuit 17D has a configuration in which a switch part 50 is added to the abnormality detection circuit 17C.

The switch part 50 selects one of a first connection state where the common voltage is supplied to the non-inverting input terminal of the comparator 43 and the inverting input terminal of the comparator 44, the output of the D/A converter 41 is supplied to the inverting input terminal of the comparator 43, and the output of the D/A converter 42 is supplied to the non-inverting input terminal of the comparator 44, and a second connection state where the common voltage is supplied to the inverting input terminal of the comparator 43 and the non-inverting input terminal of the comparator 44, the output of the D/A converter 41 is supplied to the non-inverting input terminal of the comparator 43, and the output of the D/A converter 42 is supplied to the inverting input terminal of the comparator 44.

When the switch part 50 selects the first connection state, the abnormality detection circuit 17D is equivalent to the abnormality detection circuit 17C.

When the switch part 50 selects the second connection state, the abnormality detection circuit 17D determines whether or not the common voltage is within an allowable range from an allowable lower limit voltage to an allowable upper limit voltage. The switch part 50 selects the second connection state when the liquid crystal display device 10 is performing a normal display.

Figure 13:
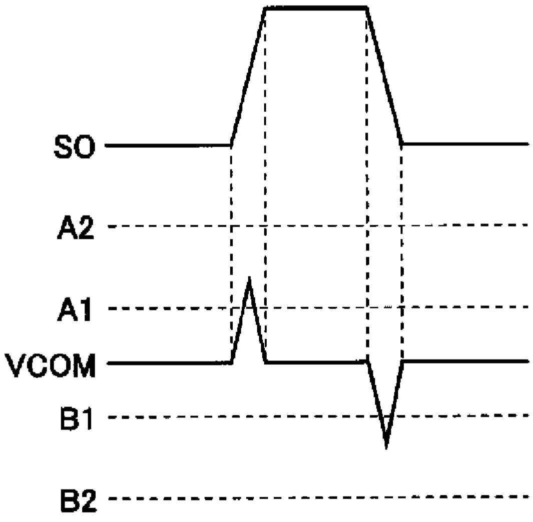
FIG. 13 is a view showing a relationship between a combined value of source voltages and a common voltage.

When the switch part 50 selects the second connection state, the D/A converter 41 converts allowable upper limit data (digital data) into an allowable upper limit voltage (analog voltage) A2 and outputs the same, and the D/A converter 42 converts allowable lower limit data (digital data) into an allowable lower limit voltage (analog voltage) B2 and outputs the same. As shown in FIG. 13, the allowable upper limit voltage A2 is larger than an upper determination voltage A1, and the allowable lower limit voltage B2 is smaller than a lower determination voltage B1.

The D/A converter 41 receives the allowable upper limit data from the logic circuit 49, and the D/A converter 42 receives the allowable lower limit data from the logic circuit 49. The allowable upper limit data and the allowable lower limit data may be changed by the register setting of the logic circuit 49 in some embodiments.

If the common voltage is out of the allowable range, the output of the filter circuit 48 goes to a low level, and the logic circuit 49 detects an abnormality in the common voltage.

6. Applications

Figure 14:
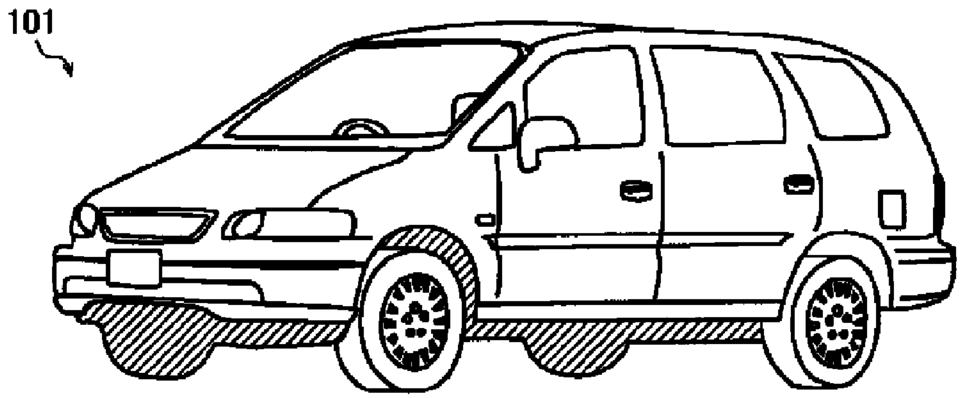
FIG. 14 is an external view of a vehicle.
Figure 15:
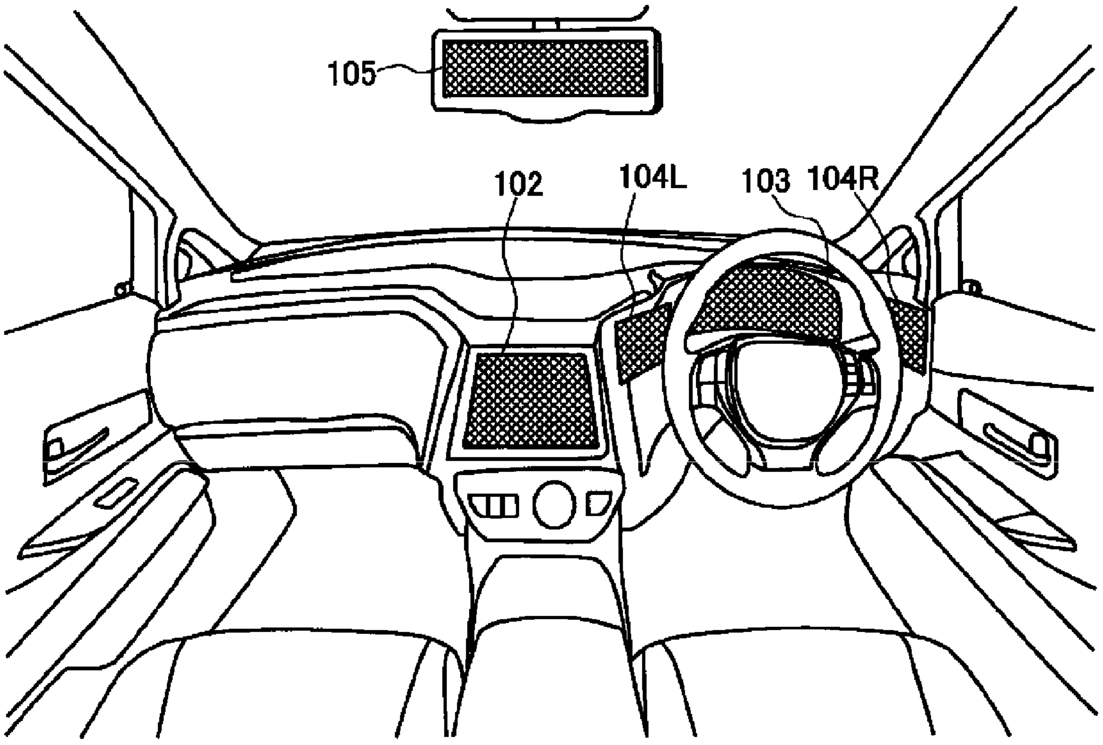
FIG. 15 is a view showing an interior of the vehicle.

The above-described liquid crystal display device is mounted, for example, on a vehicle 101 shown in FIG. 14. When the liquid crystal display device is mounted on the vehicle 101 shown in FIG. 14, it may be used for at least one of, for example, a CID (Center Information Display) 102 for displaying a map of car navigation, an instrument cluster 103, display devices 104L and 104R of an electronic side mirror system, a display device 105 of an electronic rear-view mirror system, etc. (see FIG. 15). The instrument cluster 103 may be configured by one liquid crystal display device that provides display for a plurality of instruments, and may be configured with a plurality of liquid crystal display devices, each of which provides display for at least one instrument.

7. Points of Attention

Various technical features described in the present disclosure may be modified in various ways without departing from the spirit of technical creation of the above embodiments, in addition to the embodiments.

For example, at least two of the abnormality detection circuits 17A to 17D may be mounted on the same liquid crystal display device. In this case, a part (for example, a logic circuit) that can be shared by a plurality of abnormality detection circuits may be shared in some embodiments.

An abnormality detection circuit described in the present disclosure may detect an abnormality in a liquid crystal display device without using a special liquid crystal display panel While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. An abnormality detection circuit comprising:

a plurality of voltage dividing circuits;

a first selector configured to select and output one of a plurality of outputs of the plurality of voltage dividing circuits;

a first comparator configured to compare an output of the first selector with a reference voltage;

a first detector configured to detect an abnormality based on an output of the first comparator;

a recognizer configured to recognize a timing at which a combined value of a plurality of voltages output from a plurality of source channels of a liquid crystal display panel is changed by a predetermined amount or more in a period in which the plurality of source channels do not affect display of a liquid crystal display device including the liquid crystal display panel; and a second detector configured to determine whether or not a pulse of a predetermined magnitude or more appears in a common voltage applied to a common electrode of the liquid crystal display panel at the timing recognized by the recognizer, and detect the abnormality based on a result of the determination, wherein the selection of the first selector is switched in synchronization with a vertical synchronization signal or a horizontal synchronization signal of the liquid crystal display device.

2. A liquid crystal display device comprising: the abnormality detection circuit of claim 1.

3. A vehicle comprising: the liquid crystal display device of claim 2.

4. An abnormality detection circuit comprising:

a recognizer configured to recognize a timing at which a combined value of a plurality of voltages output from a plurality of source channels of a liquid crystal display panel is changed by a predetermined amount or more in a period in which the plurality of source channels do not affect display of a liquid crystal display device including the liquid crystal display panel; and a detector configured to determine whether or not a pulse of a predetermined magnitude or more appears in a common voltage applied to a common electrode of the liquid crystal display panel at the timing recognized by the recognizer, and detect an abnormality based on a result of the determination.

5. A liquid crystal display device comprising: the abnormality detection circuit of claim 4.

6. A vehicle comprising: the liquid crystal display device of claim 5.

* * * * *